WILLIAM M. HURLBERT, OF WINONA, MINNESOTA.

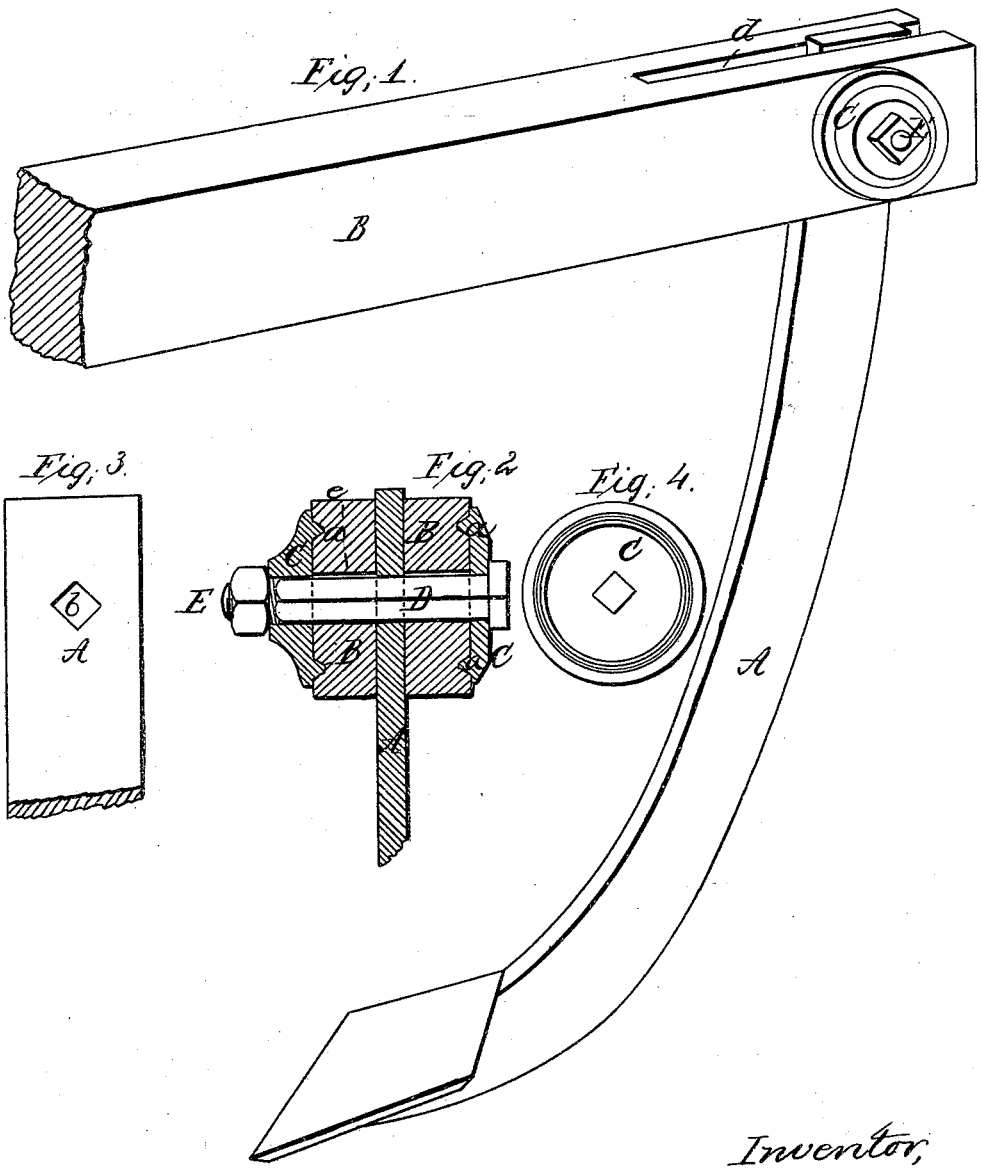

Letters Patent No. 86,306, dated January 26, 1869.

IMPROVEMENT IN ADJUSTABLE CULTIVATOR-TEETH.

The Schedule referred to in these Letters Patent and making part of the same.

*To all whom it may concern:*

Be it known that I, WILLIAM M. HURLBERT, of Winona, in the county of Winona, and State of Minnesota, have invented certain new and useful Improvements in Adjustable Cultivator-Teeth; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in an improved adjustable cultivator-tooth, which may be so adjusted as to stand at any required angle to the drag-bar.

In the drawings—

Figure 1 is a perspective view of a drag-bar, with my adjustable tooth attached;

Figure 2, a vertical cross-section through the centre of the tooth, and the clamps for holding it;

Figure 3 is a side view of the head of the tooth, showing the square hole through it; and Figure 4 is an inside face view of one of the washers, or plates, showing the square opening through it, and also its annular flange.

A represents an iron cultivator-tooth, having a square hole, $b$, through it, near the upper end.

B is the drag-bar, having a vertical slot, $d$, cut into it from the rear end, equal in width to the thickness of the tooth, and also having a round hole, $e$, through it, near the rear end, and on the two outer sides annular grooves, concentric with said hole $e$.

C C are circular metal plates, or washers, having through their centres square holes, or openings, $c$, of the same size as the hole $b$ in the tooth A, and also being formed with annular V-shaped flanges $a$ upon their inner faces, as shown in figs. 2 and 4, the circles described by the said flanges being of the same diameter as the annular grooves in the outer sides of the drag-bar before mentioned.

D is a square bolt, of the same diameter as the holes $b$ and $c$, formed with a solid head on one end, and provided with a nut, E, on the other.

When in use, the upper end of the tooth A is placed in the slot $d$, with its hole $b$ in line with the opening $e$ through the drag-bar. The plates C are then placed, one upon each side of the drag-bar, and their flanges $a$ pressed into the grooves in the drag-bar, and the bolt D then inserted through the opening $c$ in one of the plates C, and passed through, with its end protruding on the opposite side of the drag-bar, passing through the tooth, drag-bar, and plates, after which the nut E is placed on the bolt and screwed up, thus hugging the plates C against the drag-bar, and the drag-bar against the tooth, thus firmly holding the tooth in any position in which it may have been previously placed.

The bolt D being square, the tooth cannot move without turning the plates C, and thus the friction of the said plates is brought to bear to prevent movement of the tooth, in addition to the friction of the drag-bar, which bears directly against it.

When the tooth is to be adjusted, it is only necessary to loosen the nut E, which will relieve the pressure upon the tooth, when it may be adjusted as desired, after which the nut is turned up.

When this tooth meets with any great or sudden resistance, as from stumps, stones, &c., sufficient to overcome the friction of the clamping-devices, the tooth will yield and pass over it, thus avoiding breakage of the tooth.

It is apparent that this clamping-device may be attached to cultivator-teeth of any form, and also to drill-teeth, teeth of hay-rakes, &c.

Having thus described my invention,

What I claim, is—

The combination of the slotted bar B and tooth A with the plates C and bolt D, when said parts are constructed and arranged as shown and described.

WILLIAM M. HURLBERT.

Witnesses:
GEO. P. WILSON,
THOS. SIMPSON.